(12) United States Patent
Stronkhorst et al.

(10) Patent No.: US 10,577,194 B2
(45) Date of Patent: Mar. 3, 2020

(54) SORTING DEVICE WITH IMPROVED CAPACITY

(71) Applicant: Optimus Sorter Holding B.V., Beuningen (NL)

(72) Inventors: Willem Dagobert Stronkhorst, Beuningen (NL); Jacobus Johannes Adrianus de Bruijn, Beuningen (NL)

(73) Assignee: Optimus Sorter Holding B.V., Beuningen (NL)

( * ) Notice: Subject to any disclaimer, the term of this patent is extended or adjusted under 35 U.S.C. 154(b) by 0 days.

(21) Appl. No.: 16/255,608

(22) Filed: Jan. 23, 2019

(65) Prior Publication Data
US 2019/0233223 A1    Aug. 1, 2019

(30) Foreign Application Priority Data

Jan. 26, 2018  (NL) .................................. 2020334

(51) Int. Cl.
*B65G 47/96* (2006.01)
*B65G 47/84* (2006.01)
*B65G 47/82* (2006.01)

(52) U.S. Cl.
CPC ......... *B65G 47/962* (2013.01); *B65G 47/844* (2013.01); *B65G 47/82* (2013.01);
(Continued)

(58) Field of Classification Search
CPC .......... B65G 47/692; B65G 2201/0258; B65G 47/844
(Continued)

(56) References Cited

U.S. PATENT DOCUMENTS

| 1,404,591 A | 1/1922 | Fredrickson |
| 3,454,614 A | 7/1969 | Tani et al. |

(Continued)

FOREIGN PATENT DOCUMENTS

| EP | 1733807 B1 | 12/2006 |
| EP | 1972579 A1 | 9/2008 |

(Continued)

*Primary Examiner* — Mark A Deuble
(74) *Attorney, Agent, or Firm* — Shewchuk IP Services, LLC; Jeffrey D. Shewchuk

(57) ABSTRACT

A device for loading, conveying and discharging objects, comprising:
a plurality of trays each one of which is intended for carrying an object from a loading position to a discharge position, in which discharge position the object leaves the tray via an unloading section of the tray,
a drive system for conveying the trays in a conveyance direction from the loading position to the discharge position, wherein for the purpose of conveying the trays along a path, the drive system comprises a series of linked driving elements,
a drive for transferring a drive power onto the drive system, which drive power is required for conveying the trays, and
a pusher arm arranged on the tray for by means of pushing away, discharging an object present on the tray, wherein pushing away takes place substantially transverse to the conveyance direction of the tray and wherein at least during conveyance of an object present on the tray the pusher arm is in a first position facing away from the unloading section, and wherein at least for discharging an object present on the tray, the pusher arm moves to a second position in which the pusher arm is near the unloading section of the tray, characterized in that a retaining means is arranged at the unloading section of the at least one tray so as to retain, in a first operation mode, an object present on the at least one tray when the object (Continued)

is moving towards the unloading section as a result of being exposed to dynamic forces during conveyance, and to allow, in a second operation mode, the pusher arm to discharge the object present on the tray by means of pushing away, and an adjusting means is arranged to position the retaining means either in the first or second operation mode.

15 Claims, 16 Drawing Sheets

(52) U.S. Cl.
CPC ...... *B65G 47/96* (2013.01); *B65G 2201/0258* (2013.01); *B65G 2207/36* (2013.01)

(58) Field of Classification Search
USPC .................................................. 198/370.02
See application file for complete search history.

(56) References Cited

U.S. PATENT DOCUMENTS

| | | | |
|---|---|---|---|
| 3,918,587 A | 11/1975 | Drew, Jr. | |
| 3,977,513 A | 8/1976 | Rushforth | |
| 4,128,163 A * | 12/1978 | Rana | B65G 17/32 198/370.02 |
| 4,187,945 A | 2/1980 | Altenpohl et al. | |
| 6,082,522 A | 7/2000 | Polling | |
| 8,413,787 B2 * | 4/2013 | Brouwer | B07C 3/06 198/370.01 |
| 2003/0221935 A1 * | 12/2003 | Barklin | B65G 17/345 198/357 |
| 2004/0221549 A1 | 11/2004 | Guttinger et al. | |
| 2005/0103599 A1 * | 5/2005 | Hartness | B65G 17/323 198/697 |
| 2010/0059333 A1 * | 3/2010 | Van Den Goor | B65G 17/066 198/370.02 |
| 2016/0001978 A1 * | 1/2016 | Ragan | B65G 17/345 198/370.02 |
| 2016/0083197 A1 * | 3/2016 | Otto | B65G 47/844 198/463.1 |
| 2017/0073172 A1 | 3/2017 | Kuijpers et al. | |
| 2017/0305674 A1 | 10/2017 | de Bruijn | |

FOREIGN PATENT DOCUMENTS

| | | |
|---|---|---|
| GB | 1208893 | 10/1970 |
| NL | 2013604 B1 | 10/2016 |
| WO | 9833046 A1 | 7/1998 |
| WO | 2009/022908 A1 | 2/2009 |
| WO | 2016/056911 A1 | 4/2016 |
| WO | 2016/133398 A1 | 8/2016 |

* cited by examiner

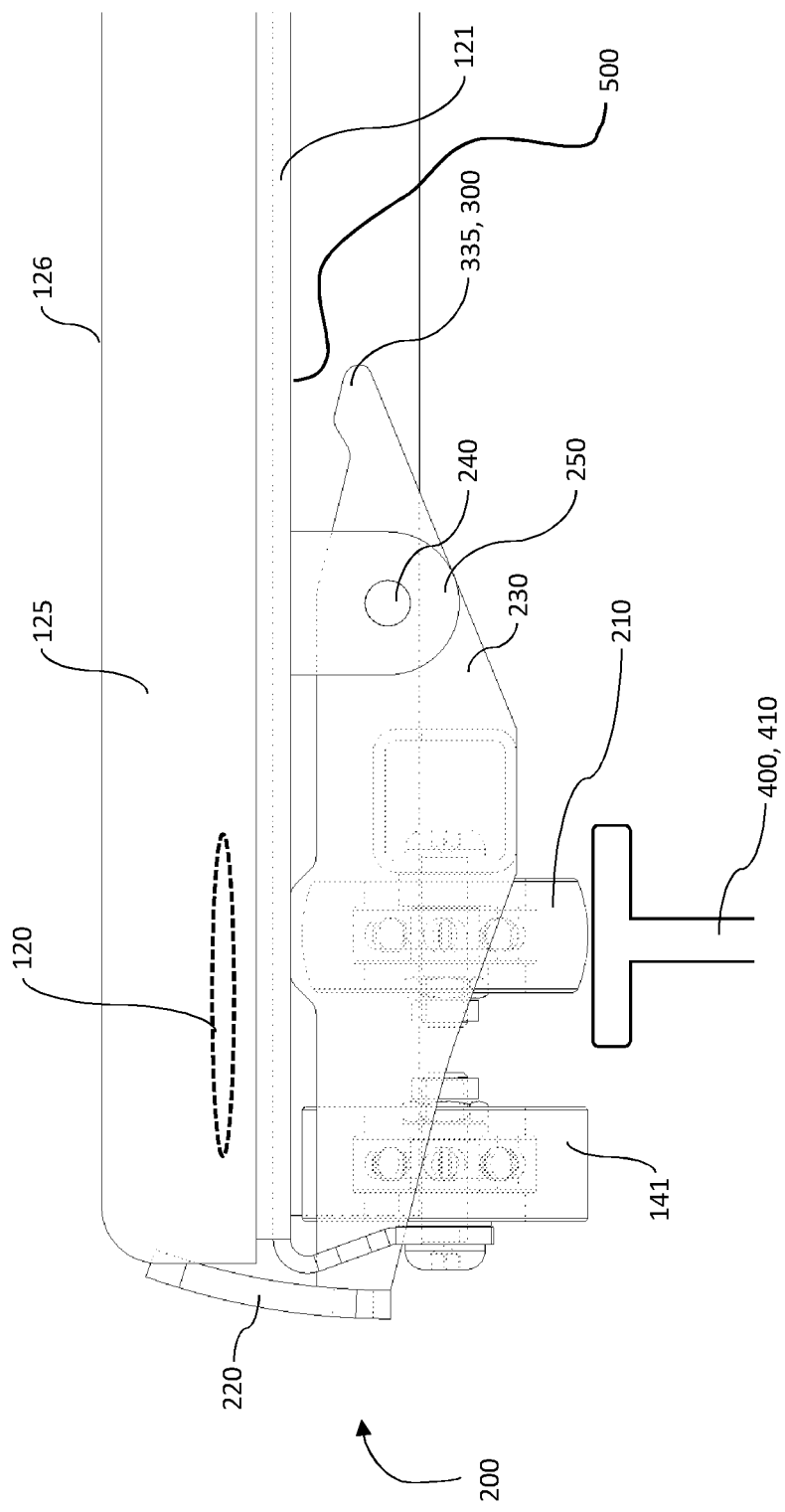

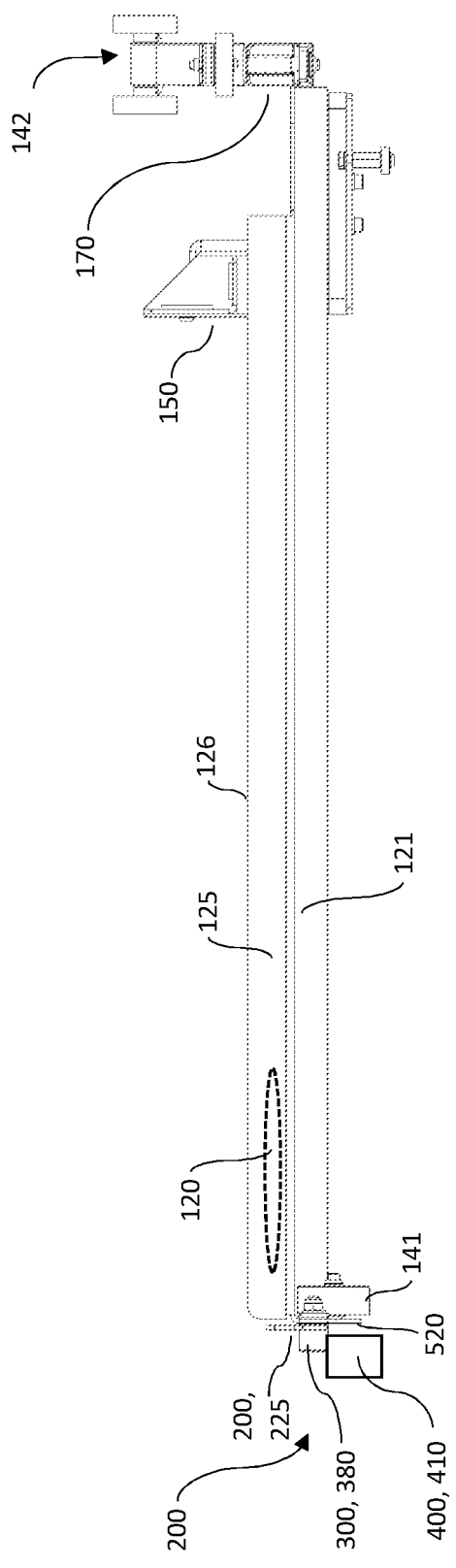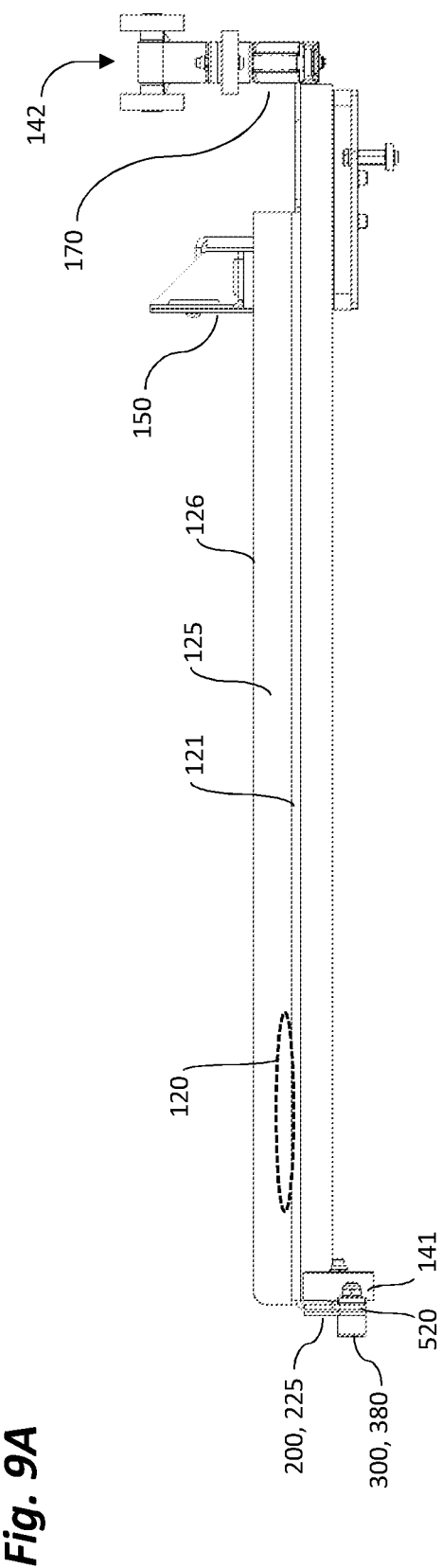
Fig. 9A
Fig. 9B

SORTING DEVICE WITH IMPROVED CAPACITY

BACKGROUND OF THE INVENTION

The present invention relates to a device for loading, conveying and discharging objects, comprising:

a plurality of trays each one of which is having a substantially horizontal plane intended for carrying an object from a loading position to a discharge position, in which discharge position the object leaves the tray via a discharge section of the tray, a drive system for conveying the trays in a conveyance direction from the loading position to the discharge position, wherein for the purpose of conveying the trays along a path, the drive system comprises a series of linked drive elements, a drive for transferring a drive power onto the drive system, which drive power is required for conveying the trays, and a pusher arm arranged on the tray for by means of pushing away, discharging an object present on the tray, wherein pushing away takes place substantially transverse to the conveyance direction of the tray and wherein at least during conveyance of an object present on the tray the pusher arm is in a first position facing away from the discharge section, and wherein at least for discharging an object present on the tray, the pusher arm moves to a second position in which the pusher arm is near the discharge section of the tray.

Recently these kind of sorting devices became very popular in supply systems, for example for supplying shops in the field of retail, and in logistic and distribution systems wherein parcels need to be sorted. Also since e-commerce expanded enormously, a lot of articles are ordered over the Internet after which the article is automatically extracted from highly efficiently arranged stocks, after which the article or even more articles are packaged or processed in boxes. The packages and boxes including the articles ordered need to be sent to the customer having ordered the article and for this purpose, the packages and boxes need to be fed to a loading position of a sorting device, the sorting device arranged for sorting the packages and boxes to a discharging position to lead the each package or box to a bin or a further sorting device or conveyor means for further distribution to an area the customer is locating.

Such sorting devices are having a large capacity since the number of bins locating around the sorting devices may be very large in order to perform a very specific preselection of objects, items, articles, packages or boxes to be distributed to very specific areas around the world. Since the capacity of these sorting devices is very large, a plurality of feeding conveyor means are arranged around the sorting device as well to provide for a highly efficient operating sorting device to achieve that the sorting device is processing according to the highest number of packages and boxes possible.

The capacity of such sorting devices is determined by the size of the sorting device defined by the number of trays. The capacity of the sorting device is also determined by the size of the trays and the speed of the trays defined by the drive system and the controller of the drive system. It is a limitation and drawback of such sorting devices that increasement of the speed of the trays results in some objects being released and dropped off from the trays unintentionally due to dynamic behaviour of the sorting device. The dynamic behaviour of objects is undesirable and may lead to the sorting device getting out of order, in most cases causing additional logistic problems.

SUMMARY OF THE INVENTION

It is an object of the present invention to improve the capacity of the sorting device and to alleviate the above mentioned drawback.

To this end, a device according to the preamble is characterized in that a barrier device is arranged at the discharge section of the at least one tray to at least partially surround, in a first operation mode, an object present on the at least one tray to prevent the object from leaving the tray via the discharge section as a result of being exposed to dynamic forces during conveyance, and to allow, in a second operation mode, the pusher arm to discharge the object present on the tray by means of pushing the object away via the discharge section; and wherein a setting means is arranged to set the barrier device from the second operation mode to the first operation mode.

In this way, it becomes possible to allow increasement of the speed of the drive system and the speed of the trays thereby increasing the capacity of the sorting device. When the barrier device is locating in its first operation mode, an at least partly surrounded object locating on the tray and starting to move due to dynamic behaviour, is blocked and retained by the barrier device so as to keep the object on the tray. The setting means having set the barrier device in its first operation mode is arranged to allow the barrier device to move in its second operation mode to provide the object to be discharged via the discharge section of the tray.

According to another embodiment, the barrier device comprises an engagement means to cooperate with the setting means to cause, when the engagement means engages with the setting means, the barrier device to move from the second operation mode to first operation mode and to cause, when engagement means is released from the setting means, the barrier device to move from the first operation mode to the second operation mode.

In this way, the barrier device may be positioned either in the first operation mode when the tray is locating in a zone along the path where dynamic forces are expected, or in the second operation mode when the tray is locating in a further zone along the path where a discharge of the object is to be expected.

According to another embodiment, the setting means is formed by a bar arranged along the path and under the space in which the plurality of trays are to be moved, the bar extending over a portion of the path in the portion of which the object may be exposed to dynamic forces during conveyance, wherein the bar is arranged in such a way that when the engagement means engages with the setting means, the barrier device is caused to move upward from second operation mode to the first operation mode and that when the engagement means releases from the setting means, the barrier device is caused to move downward from the first operation mode to the second operation mode.

In this way, the portion of the path along which objects are expected not to be discharged but rather need to be hold on the tray when being exposed to dynamic forces, is provided with setting means causing the barrier device to be acting in its first operation mode. Since during conveyance the dynamic forces will occur in particularly at a bend or at a bending portion of the path, the bar is preferably arranged at the bend or at the bending portion of the path in order to prevent the object from going off the tray due to centrifugal forces exerted on the objects caused by the angular velocity.

According to another embodiment, the barrier device comprises an obstruction means which is arranged to be positioned, when the barrier device is in the first operation mode, in a first space at least partially above the discharge section and which is arranged to be positioned, when the barrier device is in the second operation mode, in a second space extending downward from the first space, to allow the object being moved through the first space when the pusher arm discharges the object present on the tray by means of pushing it away.

In this way, the obstruction means is capable of receiving an object being exposed to dynamic forces and which would go off the tray in case the obstruction means would not be in the first space but rather in the second space.

According to another embodiment, the obstruction means is capable of pivoting relative to the tray and arranged to rotate about an axis of rotation that is parallel to the conveyance direction of the corresponding tray and wherein the engagement means are arranged on a lever system between the obstruction means and said axis of rotation when viewed along the conveyance direction.

In this way, a reliable linkage is provided allowing operation which is substantial free from friction causing a desirable degree of availability of the barrier device.

According to another embodiment, the lever system is constructed so that its center of mass causes the lever system, when the barrier device is released from the setting means, to pivot the obstruction means from the first space downward due to gravity, to arrive in the second space in which the lever system is hold by holding means so as to set the barrier device in the second operation mode.

In this way, the obstruction means are returned in the second space by default in case the engagement means of the barrier device is not in engagement with the setting means so as to provide an open first space for discharging an object by means of pushing it away from the tray by means of moving the pusher arm from its first position to its second position. To this end, the obstruction means may not remain unintentionally in the first space in the case the object needs to be discharged thereby preventing an interruption of the normal operation of the sorting device.

According to another embodiment, the holding means are formed by an outer end of the lever system, the outer end locating at an opposite side of the pivot than the obstruction means is locating, and wherein the bottom side of the tray is arranged as a stopper means to stop a pivoting movement of the lever system at the outer end of it.

In this way, the lever system is constructed within a small size space under the tray and with a small number of parts to achieve the stopper effect.

According to another embodiment, the holding means are formed by a recess arranged in the obstruction means and the tray is provided with a stopper means to receive the recess of the holding means to stop the lever system pivoting and support the obstruction means so as to keep the barrier device when it is in the second operation mode.

In this way, the lever system is constructed within a small size space next to the tray allowing the bottom side of it free, to achieve the stopper effect.

According to another embodiment, the stopper means is an extended part of the axis or shaft of a roller mounted to the tray for guiding the tray along the path, the extended part of which protruding transverse to the conveyance direction and away from the pusher arm.

In this way, the stopper means is constructed of a part of the roller construction thereby preventing to increase the number of parts used but only use an extended part of it to achieve the stopper effect.

According to another embodiment, the obstruction means is formed by an elongated element such as a strip shaped element fixed to the lever system.

In this way, a robust and reliable construction is achieved, the elongated element, such as a strip, extending over a substantial part of the discharge section of the tray so as to be capable of receiving even small objects when being exposed to dynamic forces.

According to another embodiment, the engagement means is formed by at least one wheel capable of engaging with and rolling over the setting means at least partially extending along the path so as to set the barrier device in the first operation mode.

In this way, the wheel is capable of following the bar arranged in the path to lift the obstruction means from the second space up to the first space so as to block an object when moving towards the discharge section of the tray thereby preventing the object from dropping off the tray unintentionally, such as might be the case when the tray moves in a bend.

According to another embodiment, the tray is provided with at least one through hole arranged at the discharge section of the tray, and the obstruction means is formed by at least one pin, wherein the one pin is, when the barrier device is in the first operation mode, capable of protruding through a corresponding through hole in the tray so as to allow said pin to protrude in the first space above the discharge section, and wherein the one pin is, when the barrier device moves from the first operation mode to the second operation mode, capable of lowering through the corresponding through hole in the tray so as to allow said pin to lower from the first space to the second space.

In this way, a light weight obstruction means is provided which is sufficiently preventing large objects from moving towards the unloading section of the tray thereby dropping off the tray unintentionally due to dynamic forces.

According to another embodiment, the engagement means is formed by a wheel mounted under the one pin, the wheel being capable of engaging with and rolling over the setting means at least partially extending along the path so as to set the barrier device in the first operation mode.

In this way, the wheel is capable of following the bar arranged in the path to lift the obstruction means from the second space up to the first space so as to block an object from moving towards the discharge section of the tray thereby dropping off the tray unintentionally.

According to another embodiment, the obstruction means is formed by a strip shaped element having holding means, the holding means 300 being formed by two abutment pins, wherein the tray comprises at the discharge section of it, a downward extending flap having two slots forming the stopper means for stopping the corresponding two abutment pins when the barrier device moves from the first operation mode to the second operation mode.

In this way, a practical construction is obtained which is capable of following the bar being arranged in the path to lift the obstruction means along the slots from the second space up to the first space so as to be capable to block an object when moving towards the discharge section of the tray thereby dropping off the tray unintentionally.

According to another embodiment, the setting means is attached to the tray, wherein the setting means is linked at one side to the pusher arm or to an actuator of the pusher arm and wherein the setting means is linked at an opposing side to the barrier device so as to move the barrier device from the first operation mode to the second operation mode when the pusher arm moves from its first position to its second position to discharge the object.

In this way, the setting means are arranged at the tray itself providing the possibility to keep the barrier device in the first space to prevent any unintentional movement of an object locating on the tray due to dynamic behaviour of the sorting device, all the way along the path as long as the object does not have to be discharged. As soon as the object is near and/or at the location to be discharged, the barrier device is forced to move from the first space to the second space under the influence of a linked movement of the pusher arm from its first position to its second position.

BRIEF DESCRIPTION OF THE DRAWINGS

The present invention will now be illustrated with reference to the drawing where

FIG. 3A is a front view along with the conveyance direction of a tray of the device according to the invention, the tray having a barrier device in its first operation mode;

FIG. 9A is a front view along with the conveyance direction of a tray of the device according to the invention, the tray having a barrier device in its first operation mode; and FIG. 9B is a front view along with the conveyance direction of a tray of the device according to the invention, the tray having a barrier device in its second operation mode.

In the figures, the same reference numerals denote identical components.

DETAILED DESCRIPTION OF THE PREFERRED EMBODIMENT(S)

Figure 1:
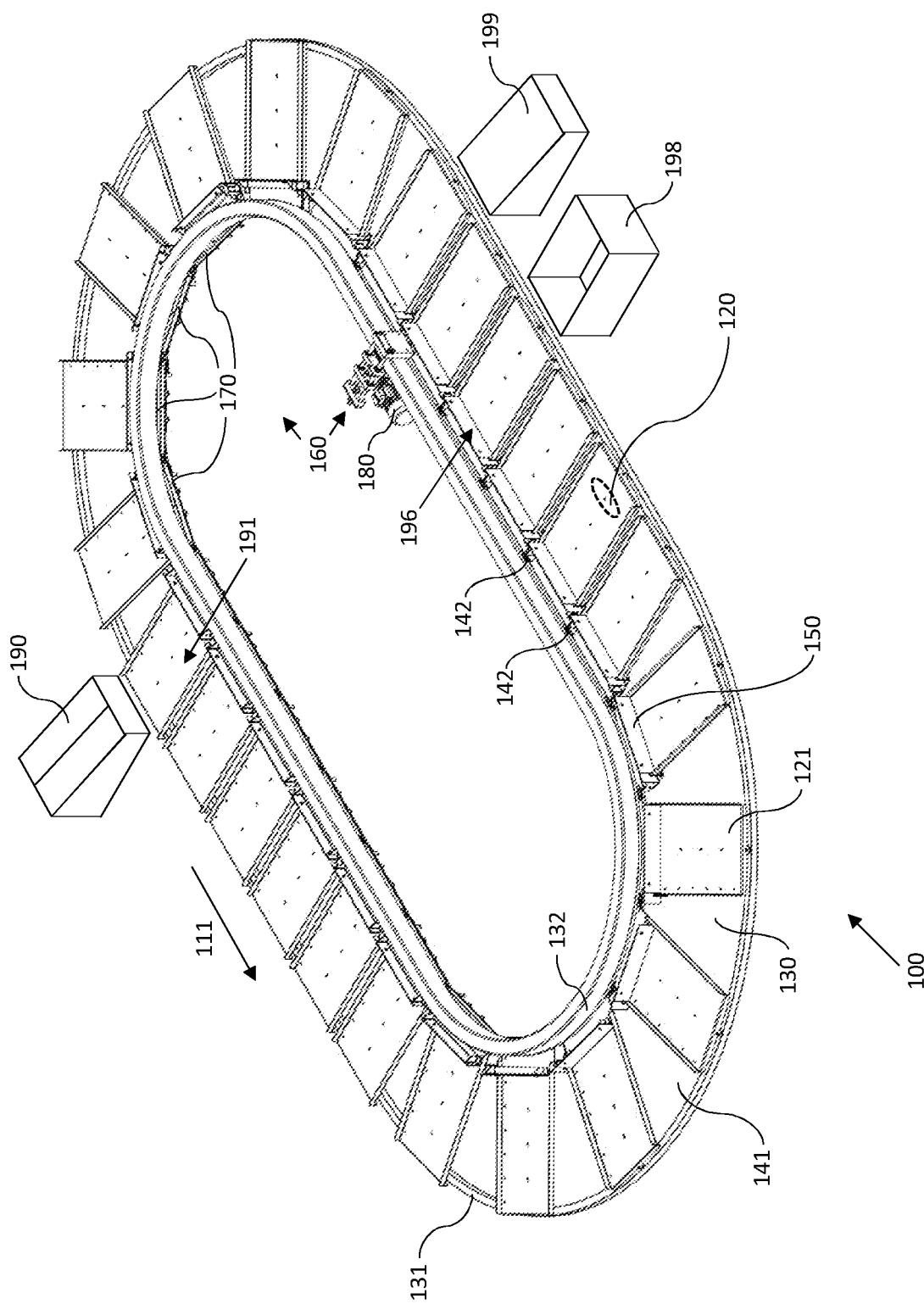
FIG. 1 is a perspective view of a device according to the invention, wherein multiple disposed trays that can be transported along a path are included that can be driven by means of a drive system that is arranged along the path.

FIG. 1 shows a device 100 according to the invention, in which the device 100 is arranged for loading, conveying and discharging goods or objects which are usually offered as single pieces by a loading device 190 at a loading position 191 to the device 100 for transport to a target position or discharge position 196 on the spot from which the object has to leave the device 100 in order to be received by a container 198 placed next to the device 100 or a further conveyer 199 to a further target position, so that sorting is carried out to objects offered to the device 100.

For the support of the objects the device 100 is provided with a plurality of trays 121 which are each intended for carrying an object in a transport direction 111 from the loading position 191 to the discharge position 198, 199. The device 100 is provided with guides 131, 132 which form a path 130 for the transport of the trays 121, the trays 121 being provided with guide elements 141, 142 to follow the guides 131, 132 of the path 130.

The device 100 is intended for a substantially continuously operating process, such as a sorting process, wherein the trays 121 are transported via the path 130 with a substantially constant speed. Partly for the benefit of the continuously operating sorting process, the path 130 is endless, i.e. the path 130 generally forms a curved trajectory or a closed loop shown in FIG. 1 wherein the trays 121 pass a same arbitrary point of the path 130 multiple times during operation.

For driving the motion of the trays 121 the device 100 is provided with a drive system 160 which extends substantially parallel to and at a distance from the path 130 for the trays 121 that are to be conveyed in the conveyance direction 111 from the loading position 191 to the discharge position 198, 199.

The drive system 160 comprises a series of linked drive elements 170 for the purpose of transporting the trays 121 along the path 130, which are transportable along the path 130 in the conveyance direction 111. For driving the drive system 160 a drive 180 is arranged for transferring a drive power onto the drive system 160, which drive power is required for conveying the trays 121. In this example the drive 180 comprises an electric motor which transfers the drive power to the drive elements 170 via, for example, a driving wheel, connected to an end shaft of the electric motor, which is, by pressing and/or clamping against at least one of the drive elements 170, capable to transfer the driving power by means of friction or traction.

For controlling at least the drive 180 for the purpose of movement of the drive system 160 in the conveyance direction 111, a not shown control system is included in the device 100. Additionally the control system controls the positioning of an object to be sorted on a tray 121 near the loading position 198, 199. The control system is arranged for the determination of a moment at which an object can be placed on the tray 121 so that the object preferably ends up in the center of the tray 121.

At each tray 121, a pusher arm 150 is arranged for discharging an object present on a tray 121 by means of pushing it away. The pushing arm 150 is arranged on the tray 121 in such a way that pushing away takes place substantially transverse to the conveyance direction 111 of the tray 121. Each pusher arm 150 is, at least during conveyance of the objects present on one of the trays 121, locating in a first position relative to the tray 121, which is shown in FIG. 1. The pusher arm 150 is arranged at the tray 121 to move from the first position to a second position relative to the tray 121, the second position opposing the first position of the tray 121. When the tray 121 arrives at the discharge position 198, 199, an object may be pushed away from the tray 121 by the pusher arm 150 moving from the first position towards the object, engaging with the object, and moving to the second position, thereby discharging the object so that it leaves the tray 121 via a discharge section 120 of the tray 121.

Underneath the path 130 of the trays 121 the device 100 is provided with a not shown but well known exchange system for driving the pusher arm 150 to move from the first to the second position relative the tray 121. In order to achieve a space underneath the path 130 of the trays 121 with components for the benefit of the exchange system, the drive element 170, seen in a cross section transverse to the conveyance direction 111, is positioned substantially in such a way with respect to the tray 121 that a part of the tray 121 facing away from the discharge section 120 is situated between the discharge section 120 of the tray 121 and the drive element 170. As a result, the drive system 160 is situated substantially lateral with respect to the path 130 of the trays 121, so that underneath the path 130 of the trays 121 a space is available for other components needed for the device 100, such as the exchange system.

The exchange system comprises an actuator which is fixedly connected relative to the path 130 which is arranged to cooperate with a pusher arm 150 arranged on the tray 121 when in operation, to which a protrusion is connected which extends towards the exchange system. When operating the actuator, a movable part of the actuator ends up in the path of the protrusion, in such a way that the actuator contacts the protrusion and urges the protrusion in a guiding part of the exchange system, which is inclined with respect to the conveyance direction 111, so that during the conveyance of trays 121 the pusher arm 150 moves from the first position to the second position.

Figure 2A:
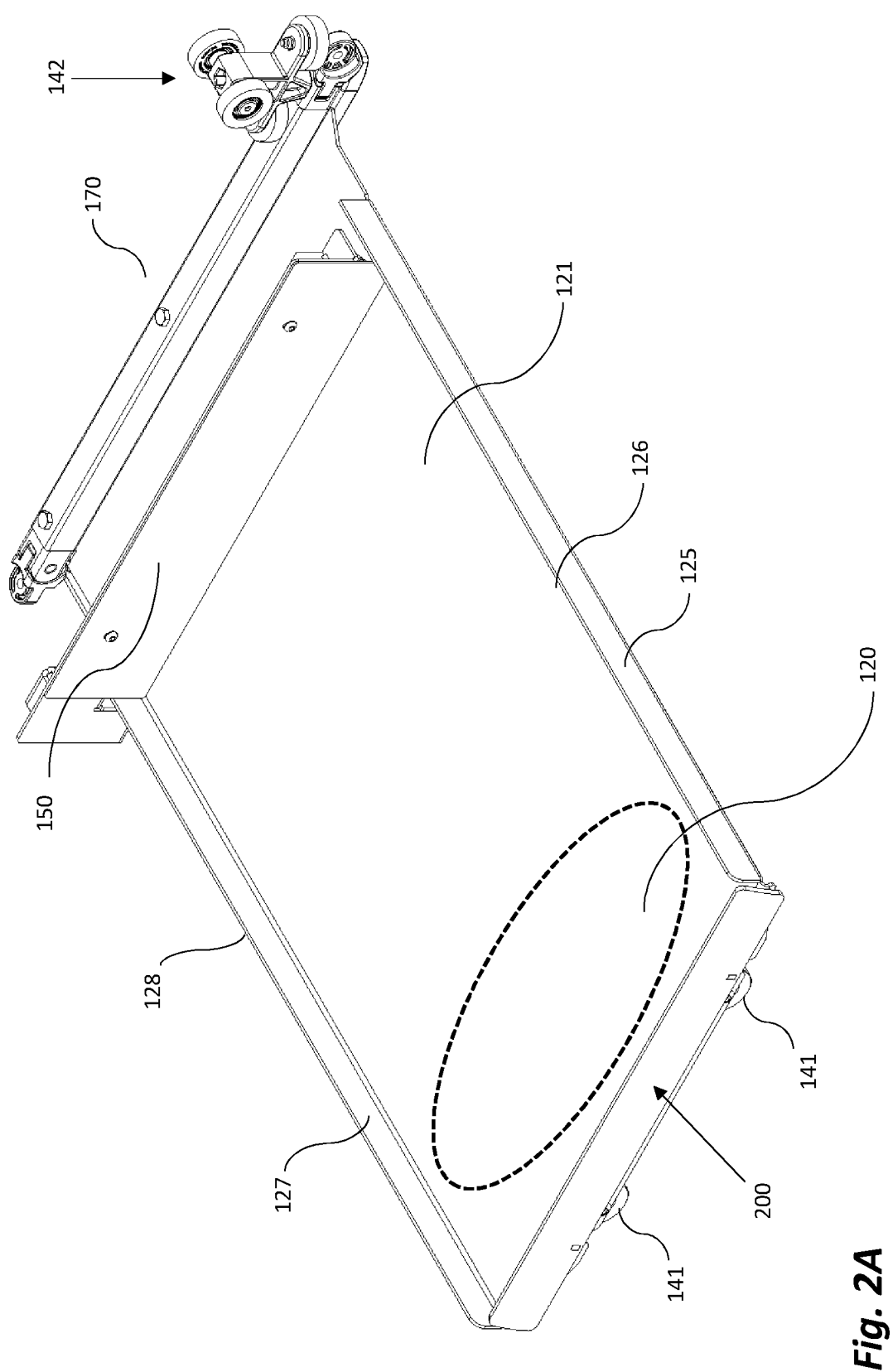
FIG. 2A is a perspective top view of a tray of the device according to the invention, the tray having a barrier device in its first operation mode.

FIG. 2A shows the tray 121 of the sorting device 100 according to the invention, wherein a barrier device 200 is arranged at the discharge section 120 of the tray 121. The purpose of the presence of the barrier device 200 is to surround, in a first operation mode, an object locating on the tray 121 in order to prevent the object from leaving the tray 121 via the unloading section 120 as a result of being exposed to dynamic forces during conveyance, for example during conveyance of the tray 121 in the curve or bend of the path 130. The surrounded object is, in this example, surrounded, or encircled, or encompassed, or enclosed by the pusher arm 150, a first tray rim 125 formed by an upstanding first edge 126 of the tray 121, the barrier device 200, and a second tray rim 127 formed by an upstanding second edge 128 of the tray 121. As a result of dynamic forces exerted on the object, the object may shift, slide or, in particular cylindrical shaped objects, roll on the top surface of the tray 121. To prevent the object from shifting, sliding and/or rolling off from the tray 121, the barrier device 200 is to be positioned in its first operation mode.

Figure 2B:
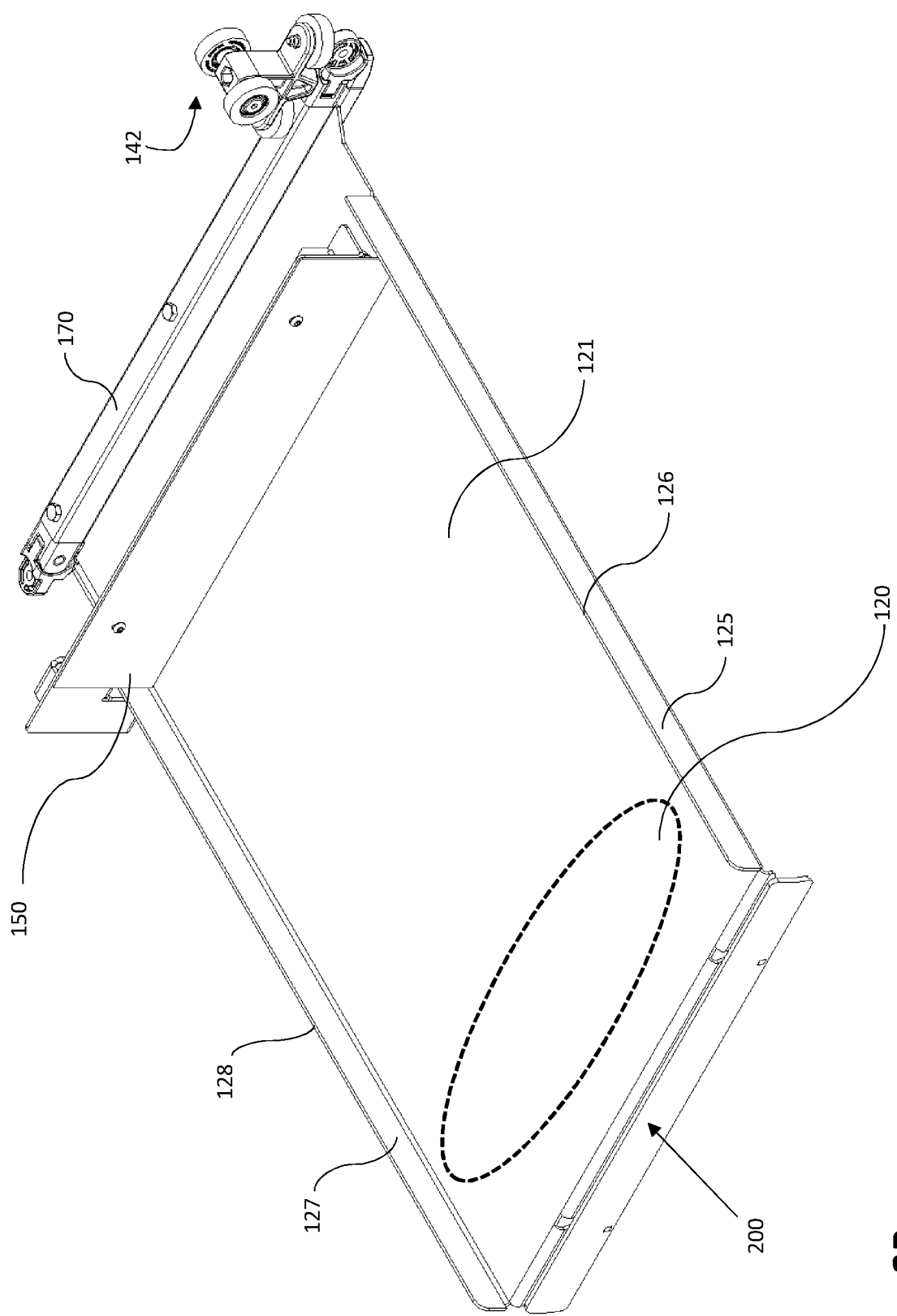
FIG. 2B is an perspective top view of a tray of the device according to the invention, the tray having a barrier device in its second operation mode.

FIG. 2B shows the tray 121 according to the tray 121 depicted in FIG. 2A, the tray 121 comprising the barrier device 200 locating, however, in a second operation mode. The barrier device 200 locating in the second operation mode, provides the tray 121 being open at the discharge section 120 of it, thereby allowing the pusher arm 150 to discharge the object present on the tray 121 by means of pushing it away from the tray via the discharge section 120. A setting means 400 first shown in FIG. 3A is arranged relative to the path 130 to set the barrier device 200 either in the first or the second operation mode. The barrier device 200 comprises an engagement means 210, also first shown in FIG. 3A, to engage with the setting means 400 to cause, the barrier device 200 to move from the second operation mode to the first operation mode and to cause, when the barrier device 200 is released from the setting means 400, the barrier device 200 to move from the first operation mode to the second operation mode.

FIG. 3A shows the tray 121 having the barrier device 200 being set in its first operation mode. The barrier device 200 comprises an obstruction means 220, in this example formed by an elongated element such as a strip shaped element 220 fixed to a lever system 230, 240, 250. The lever system 230, 240, 250 is formed by a bracket portion 230 which carries the strip shaped element 220, a hinging shaft 240 and a hinge support 250 fixed to the bottom side of the tray 121. In this example, a roller 210 is suspended to the bracket portion 230 to allow the bracket portion 230 to stay in its first operation mode as long as the roller 210 is supported by the setting means 400, in this example formed by a rail 410 or a bar 410 arranged along the path 130 and under the space in which the plurality of trays 121 are to be moved, the bar 410 extending over a portion of the path 130 in the portion of which the object may be exposed to dynamic forces during conveyance.

Figure 3B:
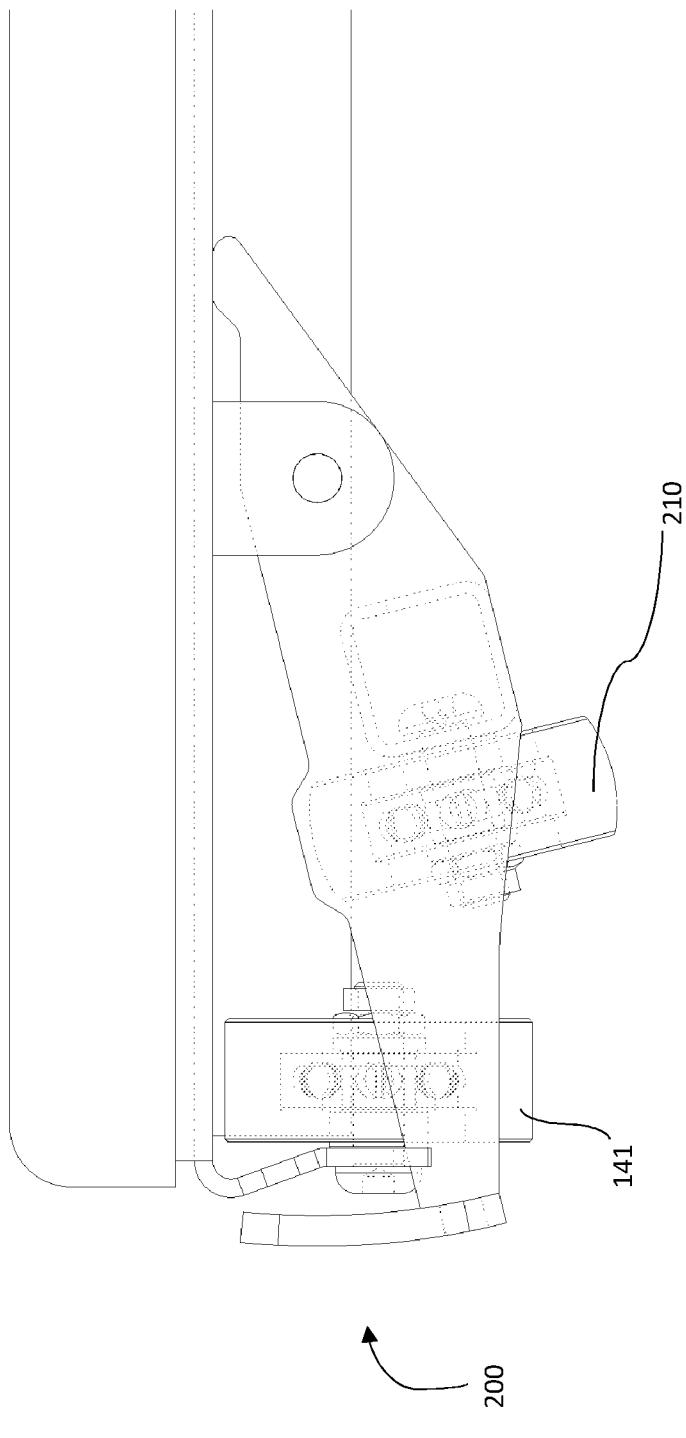
FIG. 3B is a front view along with the conveyance direction of a tray of the device according to the invention, the tray having a barrier device in its second operation mode.

According to the invention, the bar 410 is an embodiment of the setting means 400 that is arranged in such a way that when the barrier device 200, in particular the roller 210 of the lever system 230, 240, 250, meets and engages with the setting means 400, the barrier device 200 including the roller 210, the strip shaped element 220, and the bracket portion 230, is caused to move upward from second operation mode to the first operation mode. And vice versa that when the barrier device 200 releases from the setting means 400, the barrier device 200 is caused to move downward from the first operation mode to the second operation mode, which second operation mode is depicted in FIG. 3B.

The obstruction means 220 of the barrier device 200 is arranged to be positioned, when the barrier device 200 is in the first operation mode, in a first space extending at least partially above the discharge section 120 and which is arranged to be positioned, when the barrier device 200 is in the second operation mode, in a second space extending downward from the first space, to allow the object moving through the first space when the pusher arm 150 discharges the object present on the tray 121 by means of pushing it away.

In this example, the lever system 230, 240, 250 is constructed so that its center of mass causes the lever system 230, 240, 250, when the barrier device 200 is released from the setting means 400, 410, to pivot the obstruction means 220 from the first space downward due to gravity, to arrive in the second space. The obstruction means 220 are kept in the second space by the lever system 230, 240, 250 being hold by holding means 300. In this example, the holding means 300 are formed by an outer end 335 of the lever system 230, 240, 250, the outer end 335 locating at an opposite side from the pivot 240 with respect to the location of the obstruction means 220. When the lever system 230, 240, 250 rotates downward due to releasing from the setting means 400, 410 and due to gravity exerted on the lever system 230, 240, 250, a pivoting movement of the outer end 335 is stopped by a collision of the outer end 335 to stopper means 500, wherein the stopper means 500 in this example is formed by the bottom side of the tray 121.

Figure 4A:
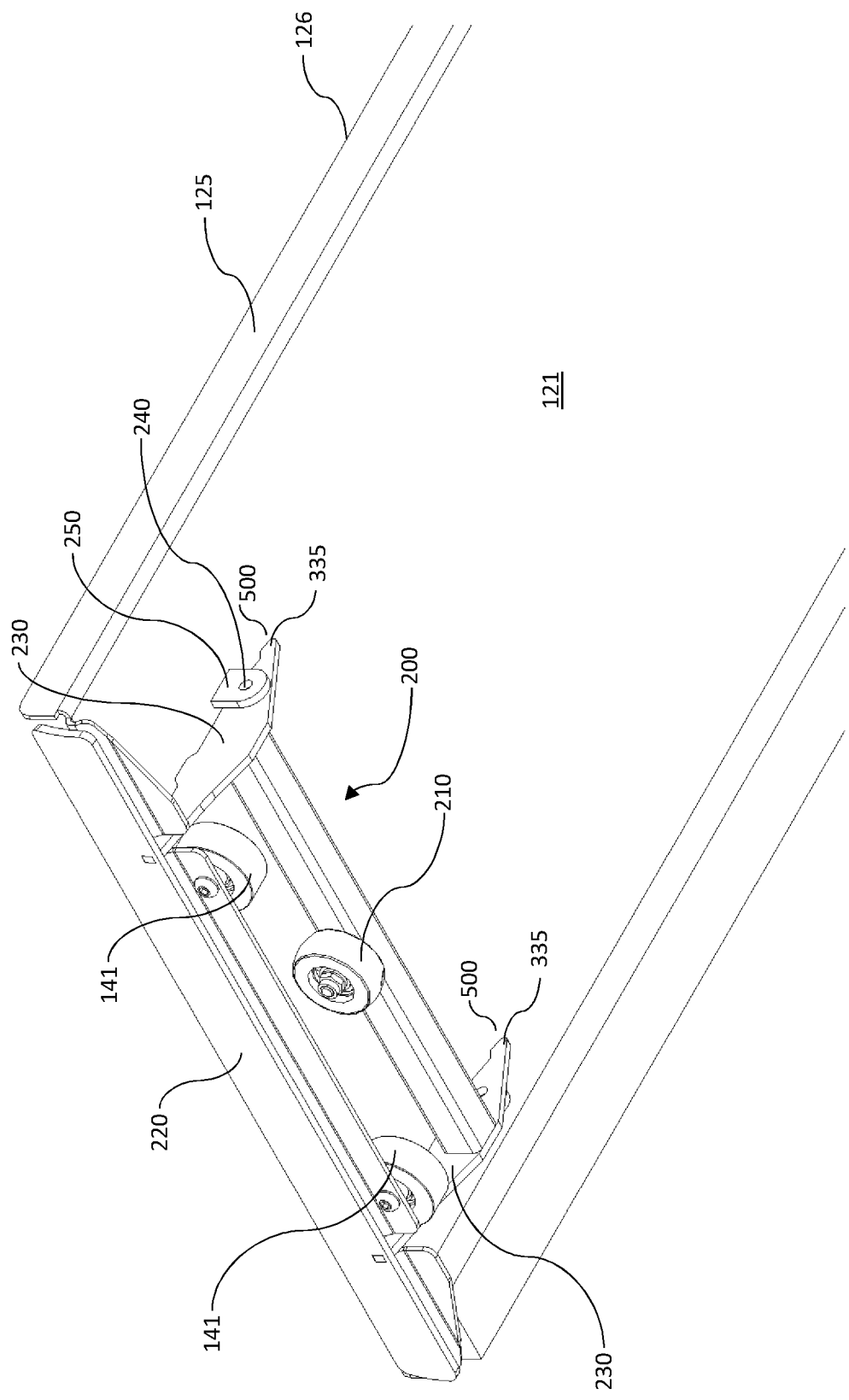
FIG. 4A is a perspective bottom view of a tray of the device according to the invention, the tray having a barrier device in its first operation mode.

FIG. 4A shows, from a perspective bottom view, the tray 121 comprising the barrier device 200 locating in its first operation mode, wherein the setting means 400 is not shown for the purpose of viewing the bottom side of the barrier device 200. In this example, the obstruction means 220 of the barrier device 200 is carried by means of two bracket portions 230 capable of pivoting around two collinear hinging shafts 240 each fixed to the bottom side of the tray 121 by means of two collinear hinge supports 250. The two bracket portions 230 are spaced apart in such an extend to allow a set of two guide rollers 141 to be present between the two bracket portions 230. In this way, the tray 121 may be loaded by heavier objects to enlarge the capacity of the sorting device even more.

Figure 4B:
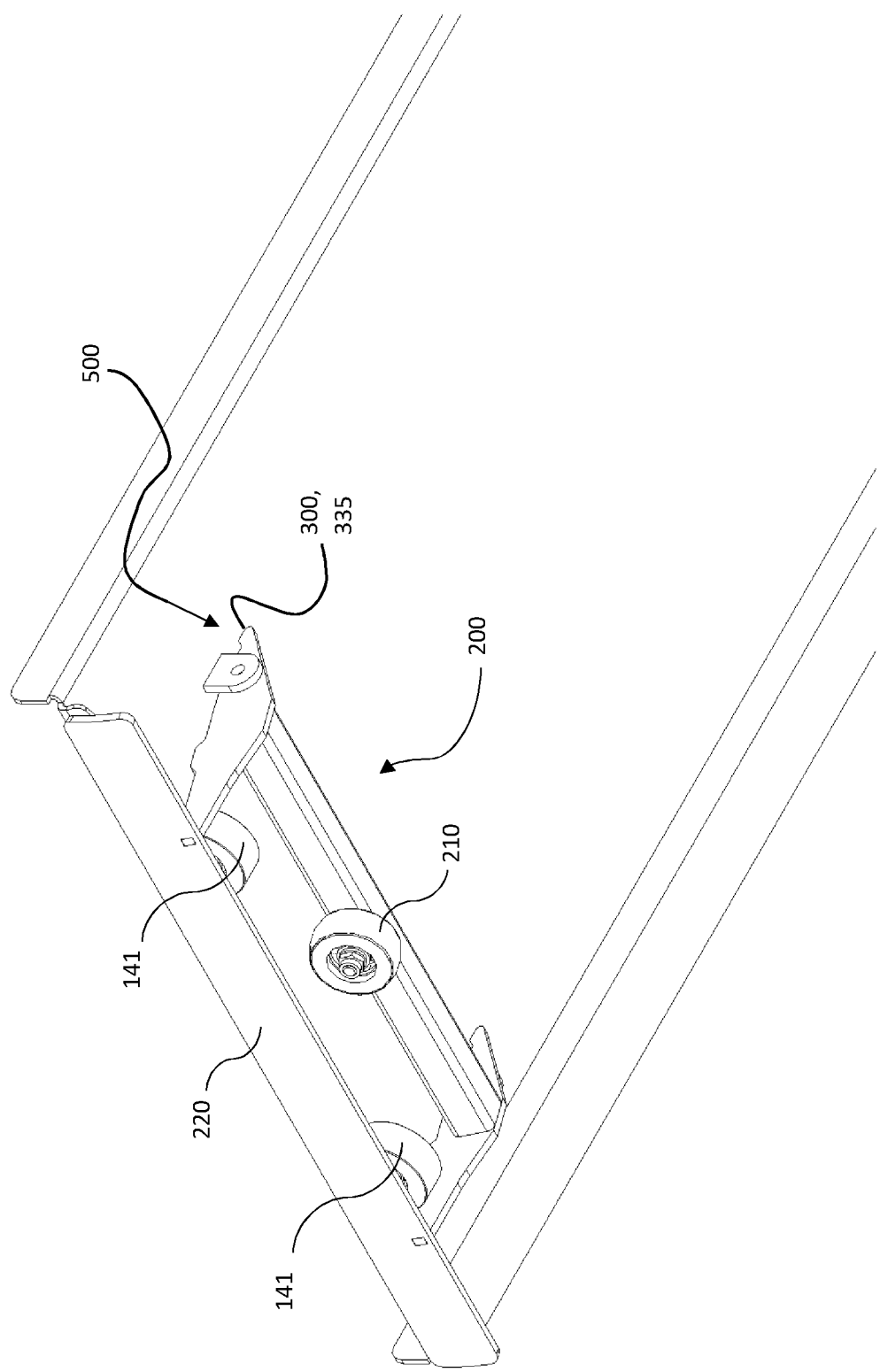
FIG. 4B is a perspective bottom view of a tray of the device according to the invention, the tray having a barrier device in its second operation mode.

FIG. 4B shows, from the same perspective view as FIG. 4A, the tray 121 comprising the barrier device 200 locating in its second operation mode. In this mode, the holding means 300 formed by the outer end 335 of the lever system 230, 240, 250 is in collision with the stopper means 500, wherein the stopper means 500 in this example is formed by the bottom side of the tray 121.

Figure 5A:
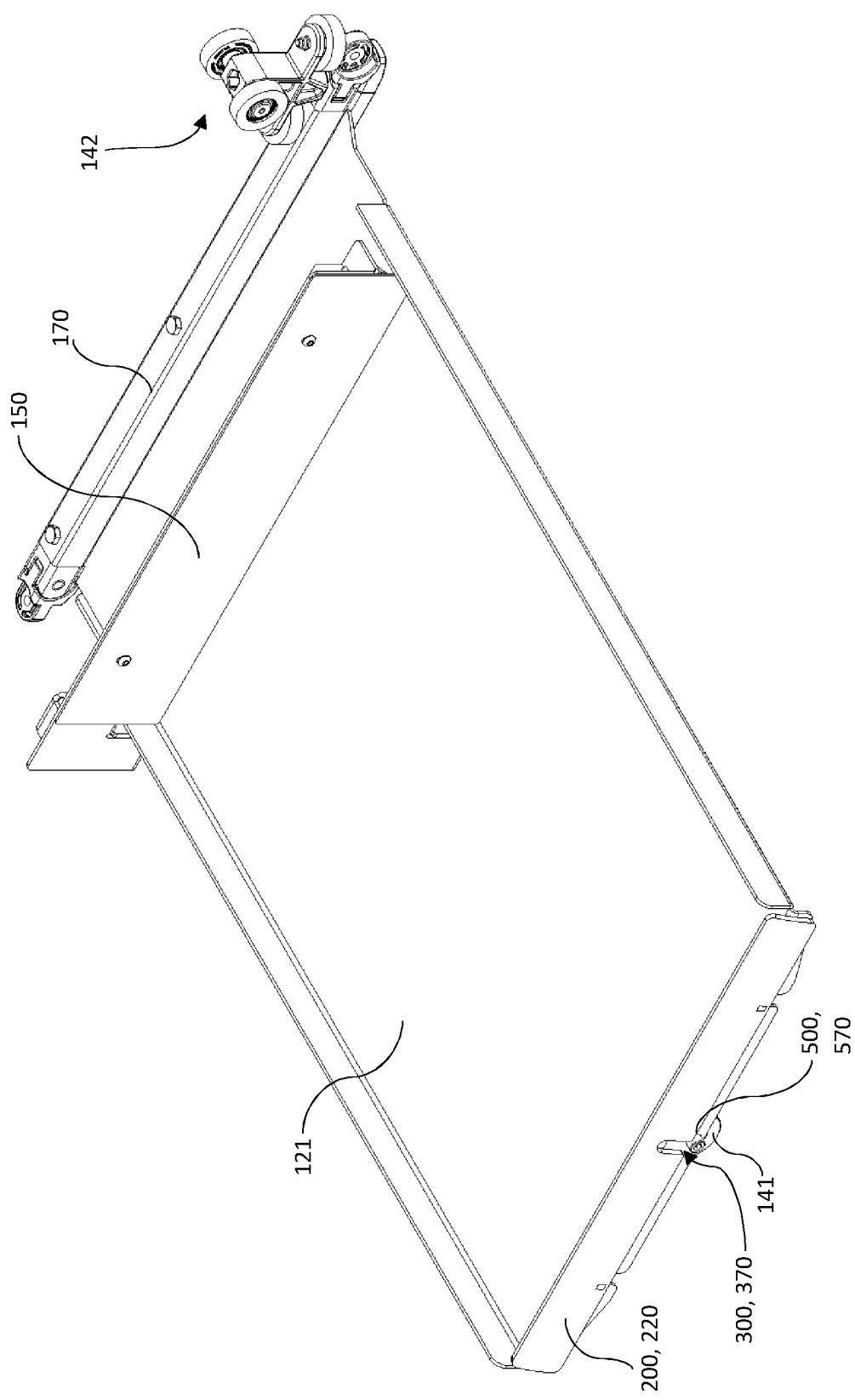
FIG. 5A is a perspective top view of a tray of the device according to the invention, the tray having a barrier device in its first operation mode.

FIG. 5A shows, from a perspective top view, the tray 121 comprising the barrier device 200 in an other example, the barrier device 200 locating in its first operation mode. The strip shaped element 220 forming the obstruction means 220 of the barrier device 200, is equipped with holding means 300, the holding means 300 in this example being formed by a recess 370 or slit 370. The recess 370 extends in this example from about the center of the strip shaped element 220 downward so as to form a gap 370 to be entered by an extended part 570 of the axis or shaft of a roller 141. In this example, the tray 121 is supported by one roller 141 which is mounted to the tray 121 for moving the tray 121 along the path 130. The extended part 570 protrudes forms the stopper means 500 transverse to the conveyance direction 111 and away from the pusher arm 150.

Figure 5B:
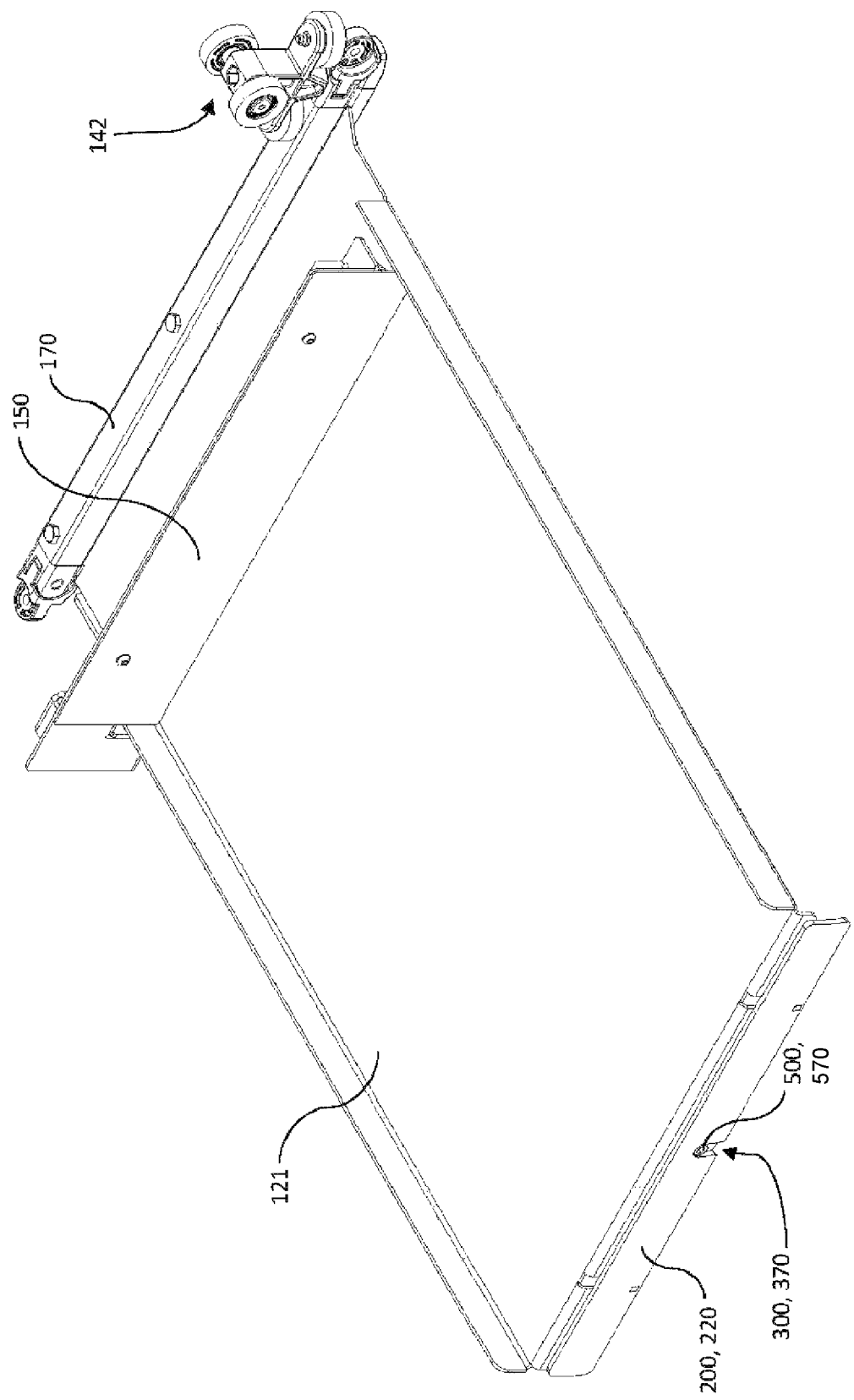
FIG. 5B is an perspective top view of a tray of the device according to the invention, the tray having a barrier device in its second operation mode.

FIG. 5B shows, from the same perspective view as FIG. 5A, the tray 121 comprising the barrier device 200 locating in its second operation mode. In this mode, the holding means 300 formed by the recess 370 is in collision with the stopper means 500, wherein the stopper means 500 in this example is formed by the extended part 570 of the axis or shaft of the roller 141 mounted to the tray 121.

Figure 6A:
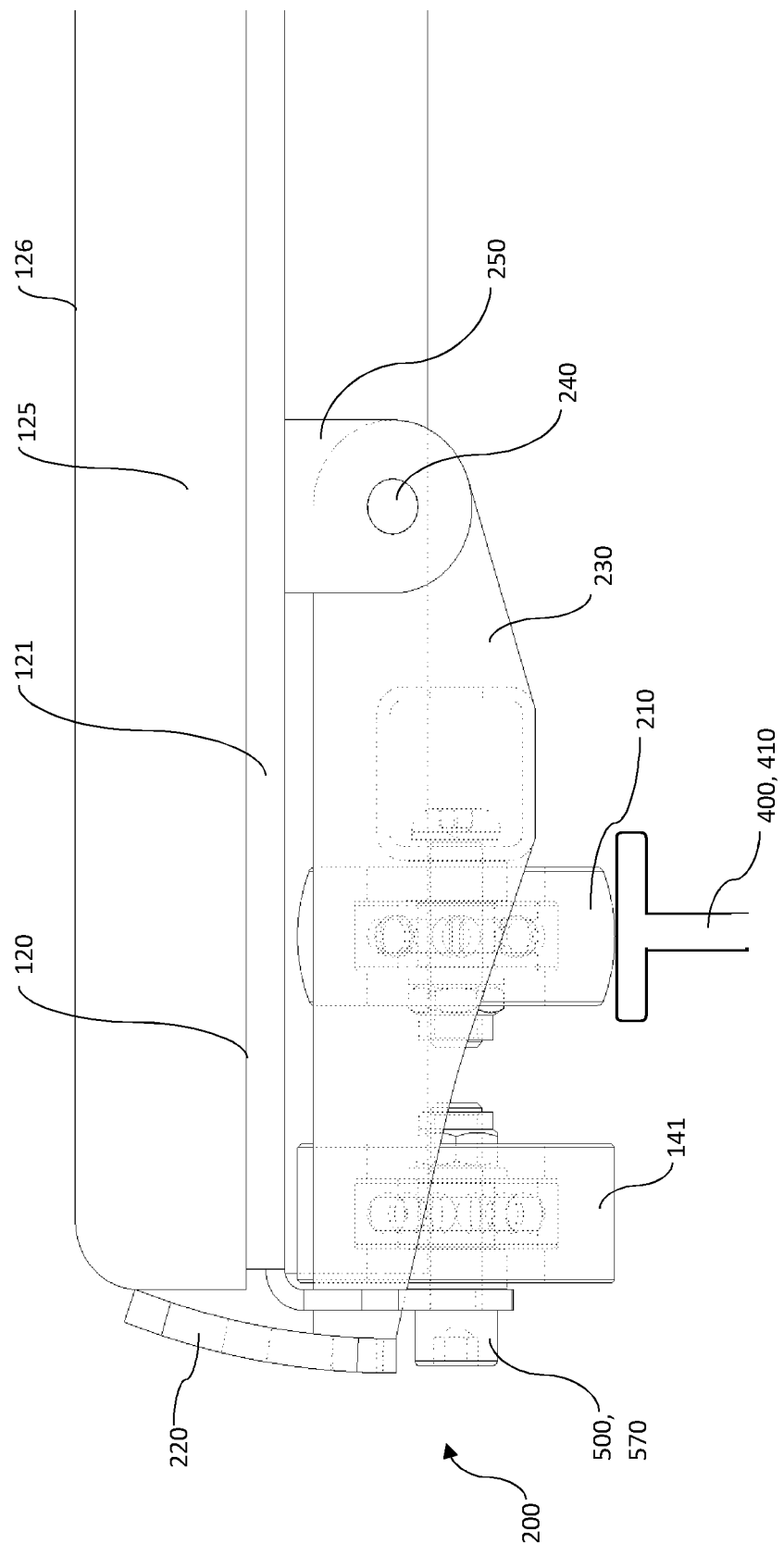
FIG. 6A is a front view along with the conveyance direction of a tray of the device according to the invention, the tray having a barrier device in its first operation mode.

FIG. 6A shows the tray 121 having the barrier device 200 being set in its first operation mode. The barrier device 200 comprises an obstruction means 220, in this example formed by an elongated element such as a strip shaped element 220 fixed to a lever system 230, 240, 250. The lever system 230, 240, 250 is formed by a bracket portion 230 which carries the strip shaped element 220, a hinging shaft 240 and a hinge support 250 fixed to the bottom side of the tray 121. A roller 210 is suspended to the bracket portion 230 to allow the bracket portion 230 to stay in its first operation mode as long as the roller 210 is supported by the setting means 400 formed by a rail 410 or a bar 410 arranged along the path 130 and under the space in which the plurality of trays 121 are to be moved, the bar 410 extending over a portion of the path 130 in the portion of which the object may be exposed to dynamic forces during conveyance.

Figure 6B:
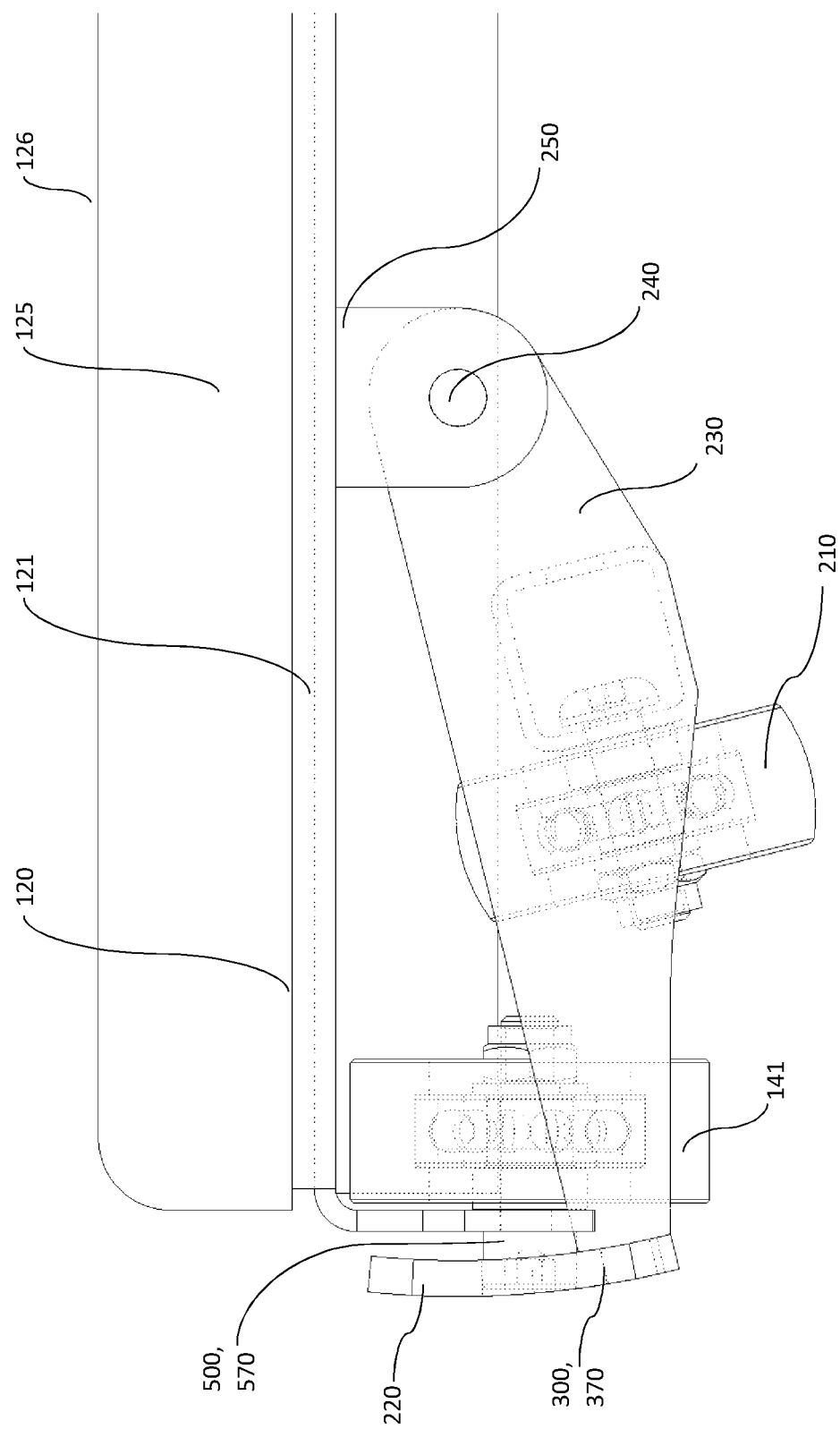
FIG. 6B is a front view along with the conveyance direction of a tray of the device according to the invention, the tray having a barrier device in its second operation mode.

The lever system 230, 240, 250 depicted in FIG. 6B is also constructed so that its center of mass causes the lever system 230, 240, 250, when the barrier device 200 is released from the setting means 400, 410, to pivot the obstruction means 220 from the first space downward due to gravity, to arrive in the second space. The obstruction means 220 are kept in the second space by the lever system 230, 240, 250 being hold by holding means 300. In this example, the holding means 300 are formed by the gap formed in the obstruction means 220. When the lever system 230, 240, 250 rotates downward due to releasing from the setting means 400, 410 and due to gravity exerted on the lever system 230, 240, 250, a pivoting movement of the obstruction means 220 is stopped by a collision of the gap 370 to stopper means 500, wherein the stopper means 500 in this example is formed by the extended part 570 of the axis or shaft of the roller 141 mounted to the tray 121.

Figure 7A:
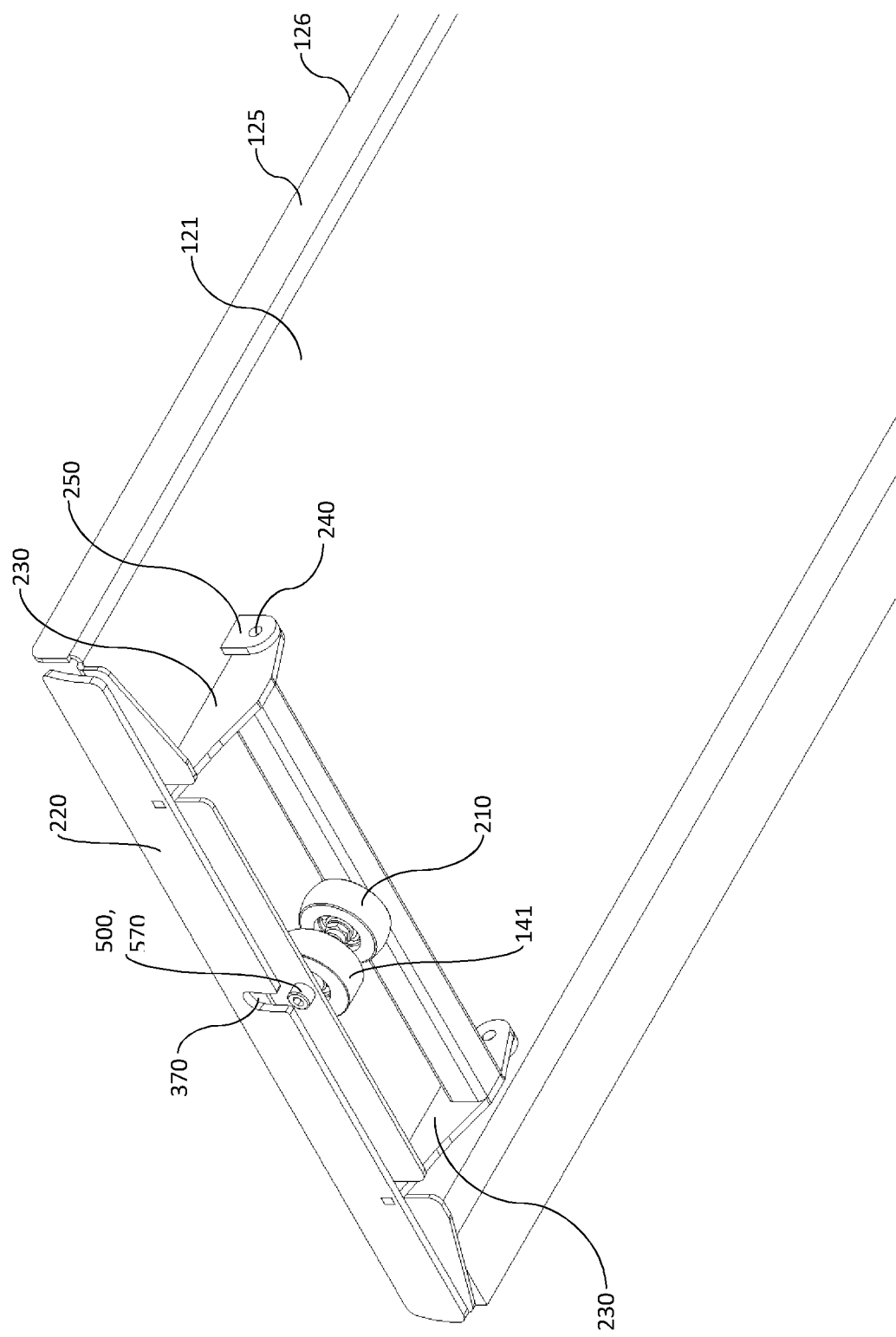
FIG. 7A is a perspective bottom view of a tray of the device according to the invention, the tray having a barrier device in its first operation mode.

FIG. 7A shows, from a perspective bottom view, the tray 121 comprising the barrier device 200 locating in its first operation mode, in accordance with FIGS. 5A and 6A. The setting means 400 is not shown for the purpose of viewing the bottom side of the barrier device 200. Similar to the roller 141 and the engaging means 210 such as the wheel 210 depicted in FIG. 6A, the center axis of these are parallel and in this example even substantial collinear.

Also in this example, the obstruction means 220 of the barrier device 200 is carried by means of two bracket portions 230 capable of pivoting around two collinear hinging shafts 240 each fixed to the bottom side of the tray 121 by means of two collinear hinge supports 250. To reduce the weight of the tray construction, the number of bracket portions 230 of the lever system 230, 240, 250 may be reduced to one.

Figure 7B:
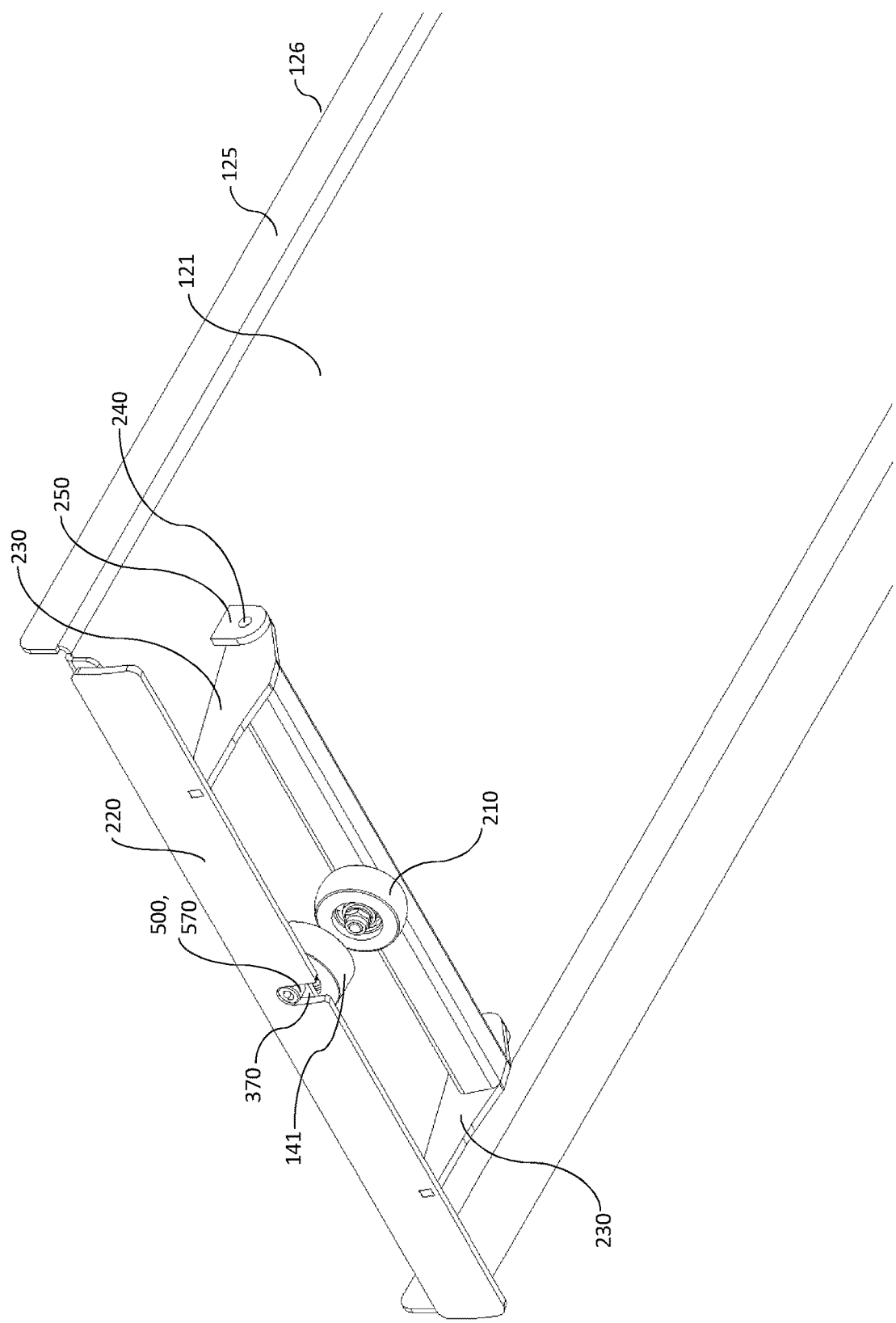
FIG. 7B is a perspective bottom view of a tray of the device according to the invention, the tray having a barrier device in its second operation mode.

FIG. 7B shows, from the same perspective view as FIG. 7A, the tray 121 comprising the barrier device 200 locating in its second operation mode, in accordance with FIGS. 5B and 6B. Similar to the roller 141 and the engaging means 210 depicted in FIG. 6B, the center axis of these form an angle since the engaging means 210 is pivotted downward through the release or a lacking or non present setting means 400 such as the bar 410.

Figure 8A:
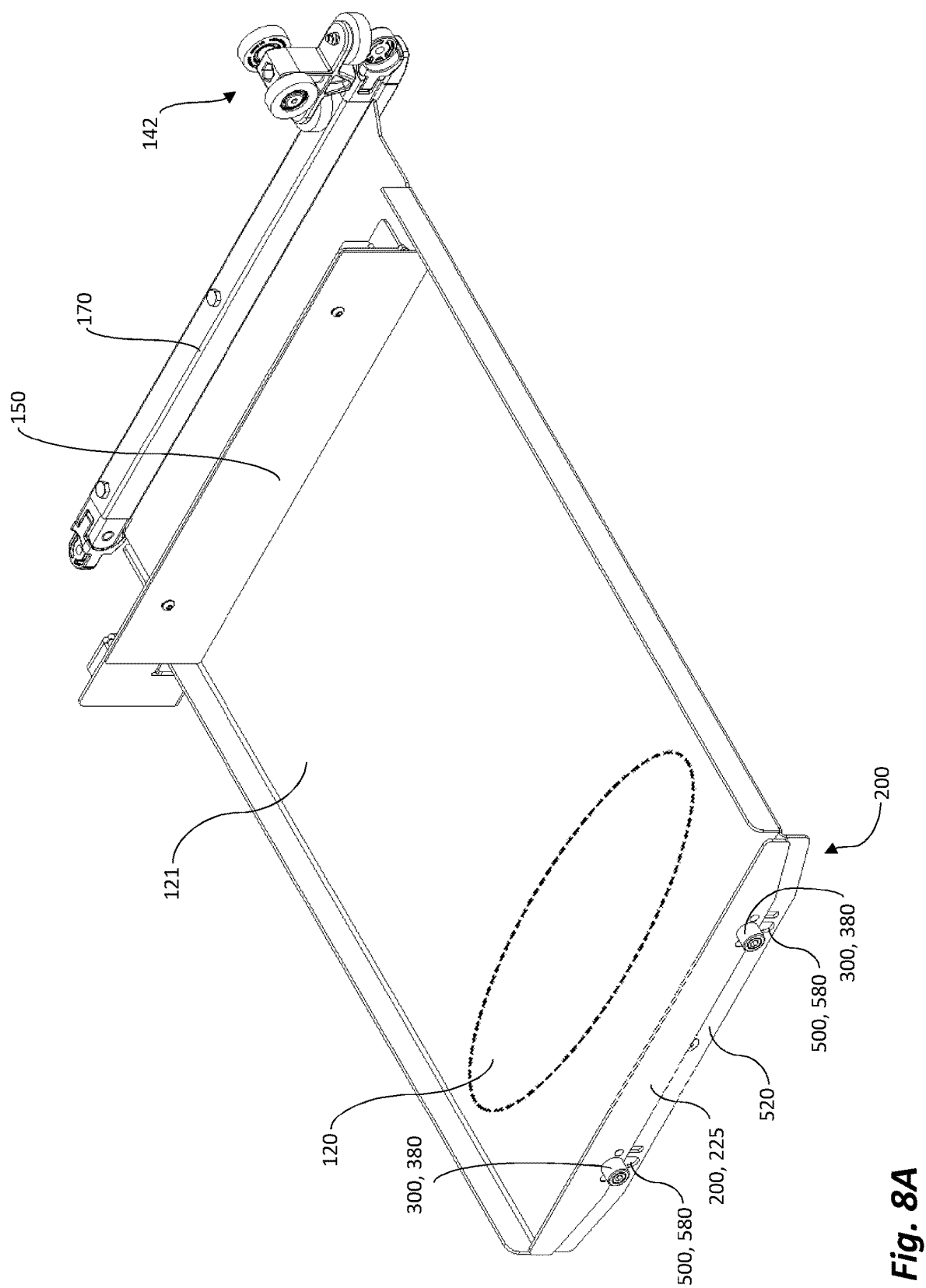
FIG. 8A is a perspective top view of a tray of the device according to the invention, the tray having a barrier device in its first operation mode.

FIG. 8A shows, from a perspective top view, the tray 121 comprising the barrier device 200 locating in its first operation mode. The elongated element such as the strip shaped element 225 forming the obstruction means 220 of the barrier device 200, is equipped with holding means 300, the holding means 300 in this example being formed by two abutment pins 380. The abutment pins 380 extend from the obstruction means 220 transverse to the conveyance direction 111. The tray 121 comprises, in this example, at the discharge section 120 of it, a downward extending flap 520 having two slots 580 forming the stopper means 500 for stopping the corresponding two abutment pins 380 when the barrier device 200 moves from the first operation mode to the second operation mode depicted in FIG. 8B.

Figure 8B:
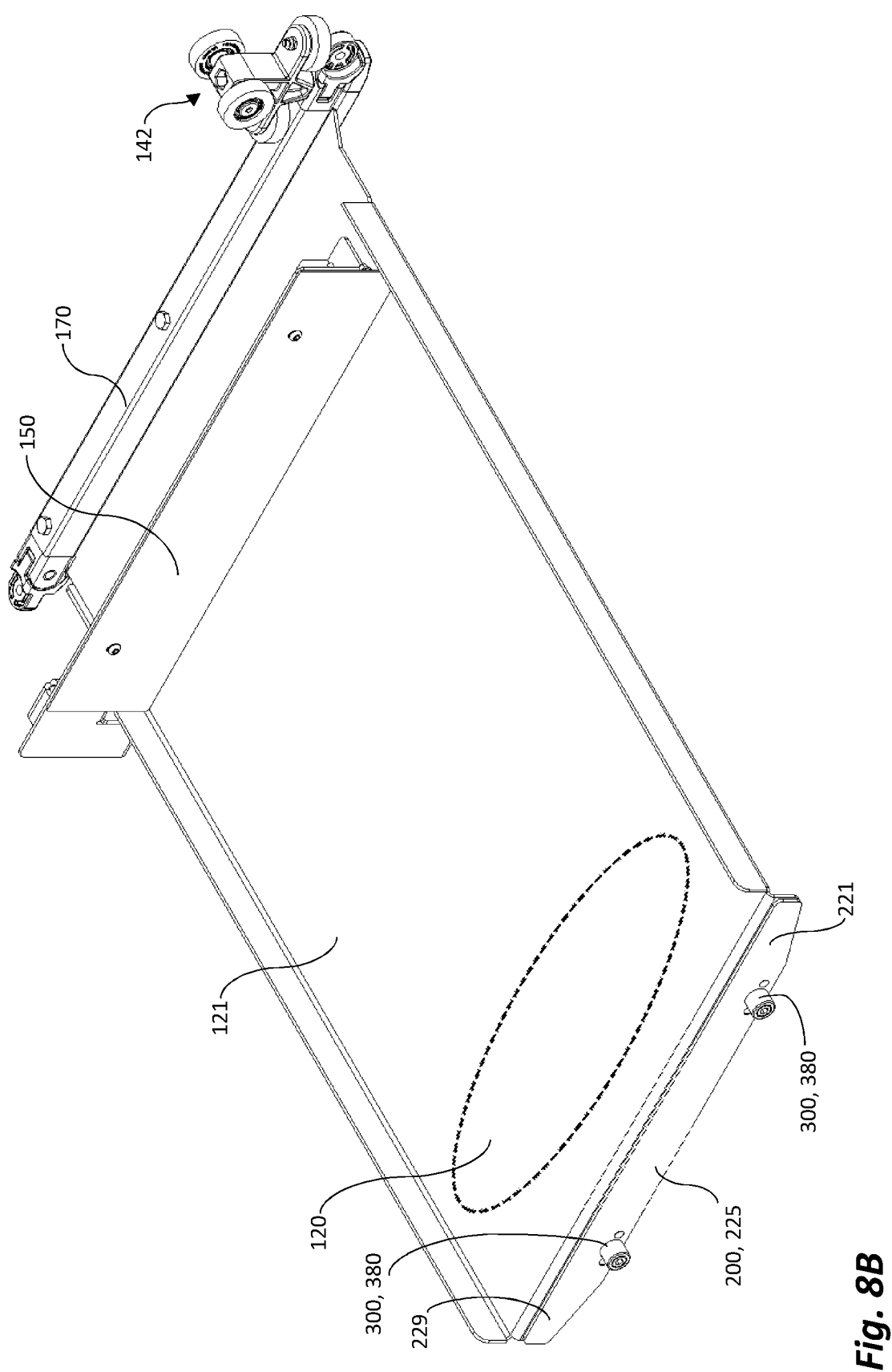
FIG. 8B is an perspective top view of a tray of the device according to the invention, the tray having a barrier device in its second operation mode.

FIG. 8B shows, from the same perspective view as FIG. 8A, the tray 121 comprising the barrier device 200 locating, however, in its second operation mode. In this mode, the holding means 300 formed by the abutment pins 380 are in collision with the stopper means 500, wherein the stopper means 500 in this example is formed by the two slots 580 arranged in the downward extending flap 520 of the tray 121.

FIG. 9A shows the tray 121 having the barrier device 200 set in its first operation mode. The strip shaped element 225 is in the first space after it is urged by the setting means 400 when the setting means 400 are engaged by the engagement means 210. The engagement means 210 are, in this example, formed by the abutment pins 380 arranged to engage with a lifting portion of the setting means 400 to lift the strip shaped element 225 when engaging the setting means 400.

FIG. 9B shows the tray 121 having the barrier device 200 set in its second operation mode. From this view, both the strip shaped element 225 including the abutment pins 380 are locating in the second space extending downward from the first space in which both the strip shaped element 225 including the abutment pins 380 are locating in FIG. 9A.

In the embodiments described herein, variants are possible. For example, the obstruction means of the barrier device may be formed by a pin or a set of pins capable of protruding through corresponding through holes locating in the top surface of the tray. When the barrier device is in its first operation mode, the obstruction means is protruding through these holes to form an obstacle to prevent an object locating on the tray from leaving the tray when its is exerted to dynamic forces during conveyance on the sorting device. When the barrier device is in its second operation mode, the obstruction means is retracted downward in at least such an extent that the obstruction means are locating lower than the top surface of the tray. In such embodiment, the pin or the set of pins are the setting means are equipped with engagement means locating under the tray so as to engage with setting means locating along the path of the sorting device.

The invention claimed is:

1. A device for loading, conveying and discharging objects, comprising:
   a plurality of trays each one of which is having a substantially horizontal plane intended for carrying an object from a loading position to a discharge position, in which discharge position the object leaves the tray via a discharge section of the tray,
   a drive system for conveying the trays in a conveyance direction from the loading position to the discharge position, wherein for the purpose of conveying the trays along a path, the drive system comprises a series of linked drive elements,
   a drive for transferring a drive power onto the drive system, which drive power is required for conveying the trays, and
   a pusher arm arranged on the tray for by means of pushing away, discharging an object present on the tray, wherein pushing away takes place substantially transverse to the conveyance direction of the tray and wherein at least during conveyance of an object present on the tray the pusher arm is in a first position facing away from the discharge section, and wherein at least for discharging an object present on the tray, the pusher arm moves to a second position in which the pusher arm is near the discharge section of the tray, characterized in that a barrier device is arranged at the discharge section of the at least one tray to at least partially surround, in a first operation mode, an object present on the at least one tray to prevent the object from leaving the tray via the discharge section as a result of being exposed to dynamic forces during conveyance, and to allow, in a second operation mode, the pusher arm to discharge the object present on the tray by means of pushing the object away via the discharge section; and wherein a setting means is arranged to set the barrier device from the second operation mode to the first operation mode.

2. The device according to claim 1, wherein the barrier device comprises an engagement means to cooperate with the setting means to cause, when the engagement means engages with the setting means, the barrier device to move from the second operation mode to first operation mode and to cause, when the engagement means is released from the setting means, the barrier device to move from the first operation mode to the second operation mode.

3. The device according to claim 1, wherein the setting means is formed by a bar arranged along the path and under the space in which the plurality of trays are to be moved, the bar extending over a portion of the path in the portion of which the object may be exposed to dynamic forces during conveyance, wherein the bar is arranged in such a way that when the engagement means engages with the setting means, the barrier device is caused to move upward from second operation mode to the first operation mode and that when the engagement means releases from the setting means, the barrier device is caused to move downward from the first operation mode to the second operation mode.

4. The device according to claim 1, wherein the barrier device comprises an obstruction means which is arranged to be positioned, when the barrier device is in the first operation mode, in a first space at least partially above the discharge section and which is arranged to be positioned, when the barrier device is in the second operation mode, in a second space extending downward from the first space, to allow the object being moved through the first space when the pusher arm discharges the object present on the tray by means of pushing it away.

5. The device according to claim 4, wherein the obstruction means is capable of pivoting relative to the tray and arranged to rotate about an axis of rotation that is parallel to the conveyance direction of the corresponding tray and wherein the engagement means are arranged on a lever system between the obstruction means and said axis of rotation when viewed along the conveyance direction.

6. The device according to claim 5, wherein the lever system is constructed so that its center of mass causes the lever system, when the barrier device is released from the setting means, to pivot the obstruction means from the first space downward due to gravity, to arrive in the second space in which the lever system is hold by holding means so as to set the barrier device in the second operation mode.

7. The device according to claim 6, wherein the holding means are formed by an outer end of the lever system, the outer end locating at an opposite side of the pivot than the obstruction means is locating, and wherein the bottom side of the tray is arranged as a stopper means to stop a pivoting movement of the lever system at the outer end of it.

8. The device according to claim 6, wherein the holding means are formed by a recess arranged in the obstruction means and the tray is provided with a stopper means to receive the recess of the holding means to stop the lever system pivoting and support the obstruction means so as to keep the barrier device when it is in the second operation mode.

9. The device according to claim 8, wherein the stopper means is an extended part of the axis or shaft of a roller mounted to the tray for guiding the tray along the path, the extended part of which protruding transverse to the conveyance direction and away from the pusher arm.

10. The device according claim 5, wherein the obstruction means is formed by an elongated strip shaped element fixed to the lever system.

11. The device according to claim 2, wherein the engagement means is formed by at least one wheel capable of engaging with and rolling over the setting means at least partially extending along the path so as to set the barrier device in the first operation mode.

12. The device according to claim 4, wherein the tray is provided with at least one through hole arranged at the discharge section of the tray, and the obstruction means is formed by at least one pin, wherein the one pin is, when the barrier device is in the first operation mode, capable of protruding through a corresponding through hole in the tray so as to allow said pin to protrude in the first space above the discharge section, and wherein the one pin is, when the barrier device moves from the first operation mode to the second operation mode, capable of lowering through the corresponding through hole in the tray so as to allow said pin to lower from the first space to the second space.

13. The device according to claim 12, wherein the barrier device comprises an engagement means to cooperate with the setting means to cause, when the engagement means engages with the setting means, the barrier device to move from the second operation mode to first operation mode and to cause, when the engagement means is released from the setting means, the barrier device to move from the first operation mode to the second operation mode, wherein the engagement means is formed by a wheel mounted under the one pin, the wheel being capable of engaging with and rolling over the setting means at least partially extending along the path so as to set the barrier device in the first operation mode.

14. The device according claim 4, wherein the obstruction means is formed by a strip shaped element having holding means, the holding means being formed by two abutment pins, wherein the tray comprises at the discharge section of it, a downward extending flap having two slots forming the stopper means for stopping the corresponding two abutment pins when the barrier device moves from the first operation mode to the second operation mode.

15. The device according to claim 1, wherein the setting means is attached to the tray, wherein the setting means is linked at one side to the pusher arm or to an actuator of the pusher arm and wherein the setting means is linked at an opposing side to the barrier device so as to move the barrier device from the first operation mode to the second operation mode when the pusher arm moves from its first position to its second position to discharge the object.

* * * * *